Figure 1:
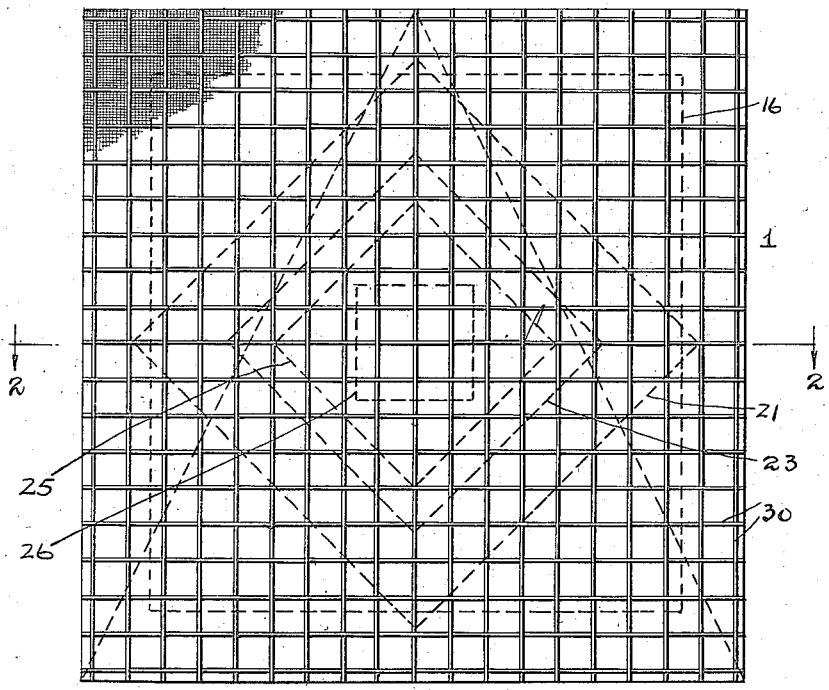

INVENTOR.
Oscar V. Greene
BY Fay, Oberlin & Fay
ATTORNEYS.

Nov. 5, 1929.  O. V. GREENE  1,734,125
FILTER ELEMENT
Filed March 27, 1925    4 Sheets-Sheet 2
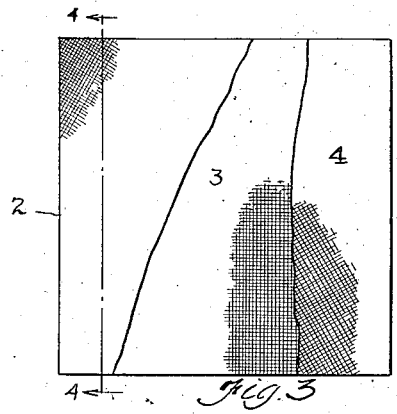
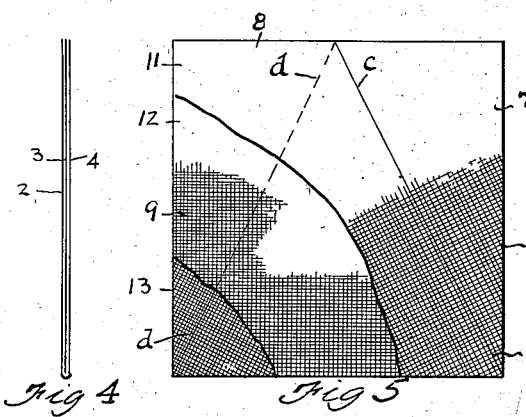
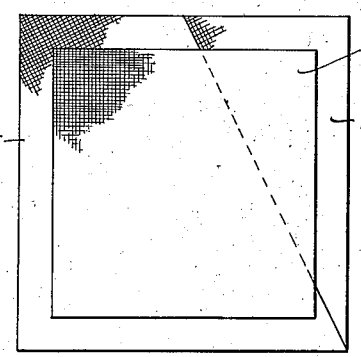
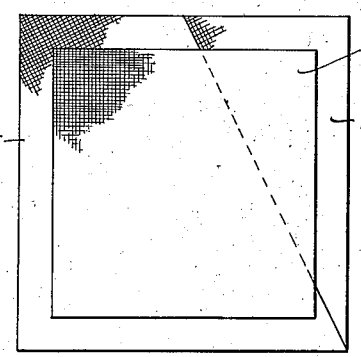
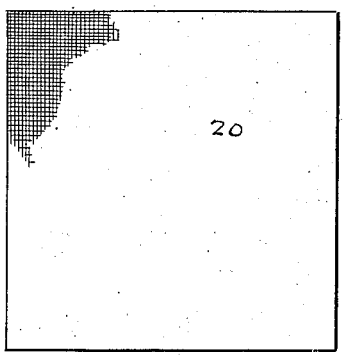
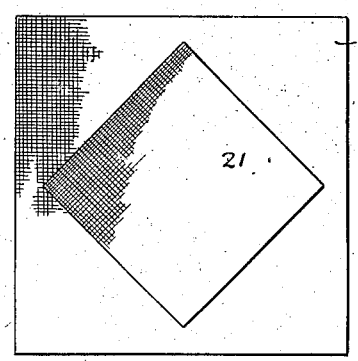
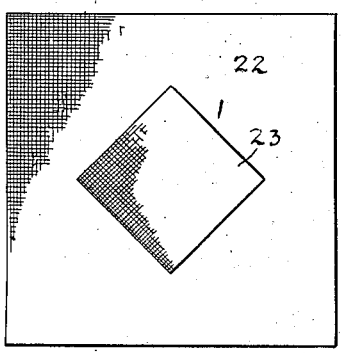
INVENTOR.
Oscar V. Greene
BY
Day, Oberlin & Day
ATTORNEYS Nov. 5, 1929.  O. V. GREENE  1,734,125

FILTER ELEMENT

Filed March 27, 1925  4 Sheets-Sheet 3

INVENTOR.
Oscar V. Greene.
BY
Fay, Oberlin & Fay
ATTORNEYS.

Nov. 5, 1929.  O. V. GREENE  1,734,125
FILTER ELEMENT
Filed March 27, 1925  4 Sheets-Sheet 4

INVENTOR.
Oscar V. Greene
BY
Fay, Oberlin & Fay
ATTORNEYS.

Patented Nov. 5, 1929

1,734,125

UNITED STATES PATENT OFFICE

OSCAR V. GREENE, OF CLEVELAND, OHIO

FILTER ELEMENT

Application filed March 27, 1925. Serial No. 18,768.

The present invention relates to filter elements for the removal of dust or dirt from air or gas and more particularly the invention relates to the construction of the filter element itself in which provision is made for compensating for the tendency of the air stream to go through the center of the element. As is well known, an air stream will tend to pass through a filtering element at a greater velocity at the center than at the marginal portions of the element and thus the effectiveness of the filtering element will be less at the center than at the marginal portions and the present invention relates to the construction of an element in which the density of the filtering material is increased from the periphery or margin of the element to the center thereof so as to compensate for the tendency of the air stream to contract and to force the element to filter in a substantially equally efficient manner throughout its entire surface area.

The present element is also constructed so as to increase the density of the unit from the intake side to the exhaust side thereof to prevent the unit from filling up or plugging or rapidly increasing its resistance as the coarser material and some of the finer is filtered out before the denser layers are encountered. A unit compensated from the periphery to the center of the unit is not only adapted for filtering purposes but is also adapted for use as a compensator unit with fans or blowers or in any place where it is desired to control the flow of air and where the air stream tends to contract and increase velocity at the center. More particularly, the present unit is constructed in the same general manner as the filtering element shown in my copending application for United States Letters Patent, Serial No. 688,715, in which the filter element is built up of a series of spaced parallel foraminous sheets which are separated by other foraminous sheets which are corrugated or formed into a series of regular open folds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 2:
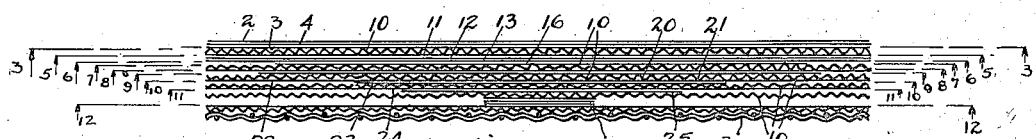
Figure 13:
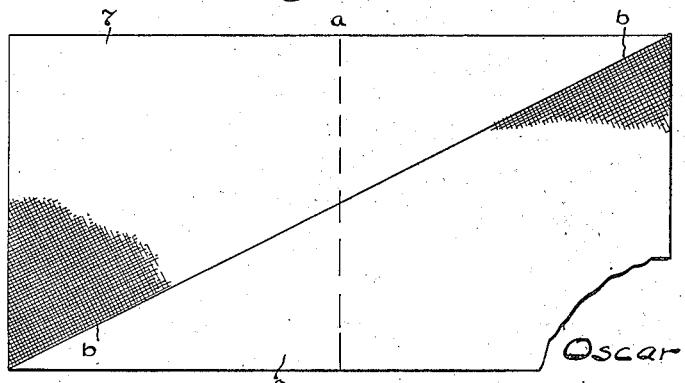
Figure 14:
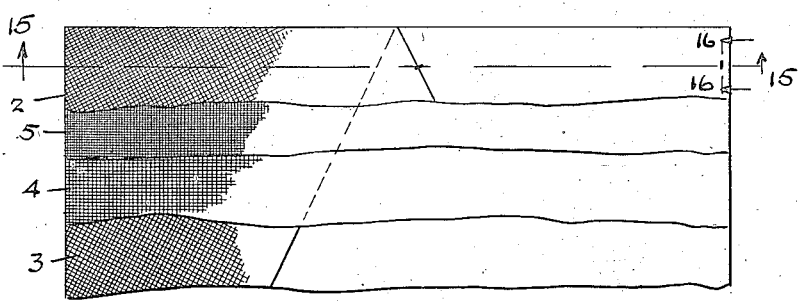
Figure 16:
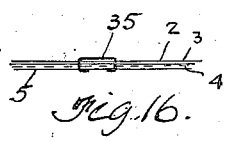
Figure 17:
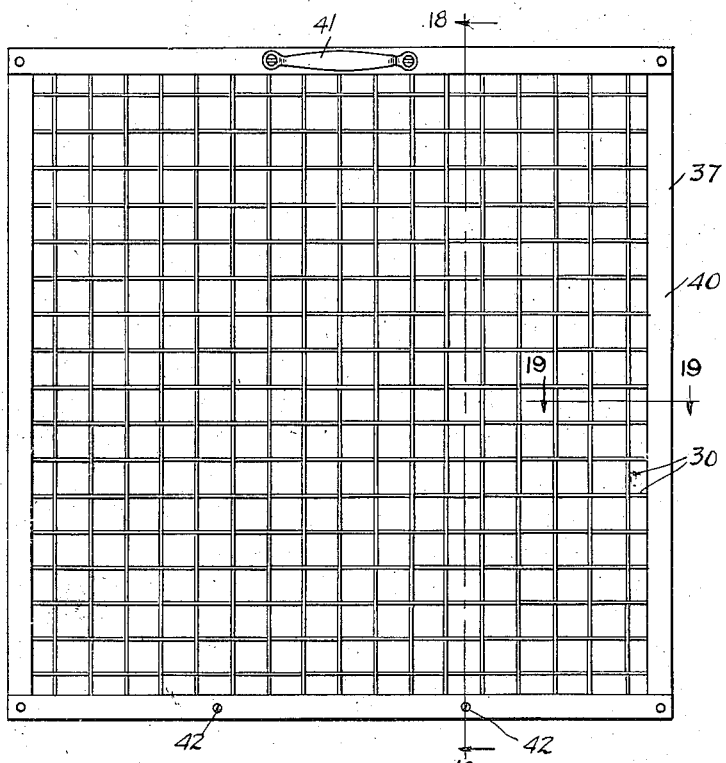
Figure 18:
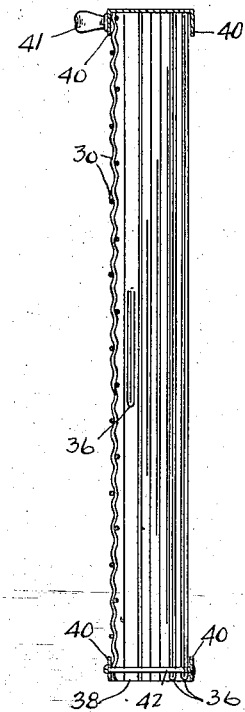
Figure 19:
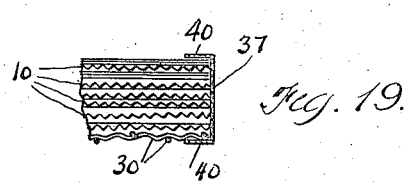
Figure 20:
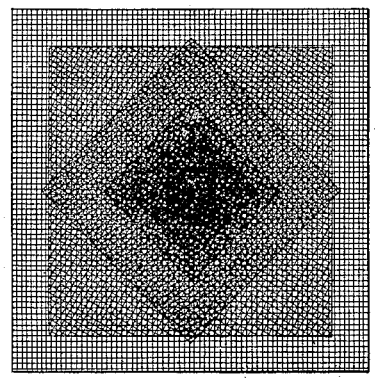

Fig. 1 is a plan view of the element taken from the air intake side thereof; Fig. 2 is a diagrammatic sectional view on the line 2—2 of Fig. 1; Fig. 3 is a sectional view on the line 3—3 of Fig. 2 showing in plan the element next to the exhaust side of the unit; Fig. 4 is a diagrammatic sectional view on the line 4—4 of Fig. 3; Figs. 5, 6, 7, 8, 9, 10, 11 and 12 are diagrammatic sectional views taken on the lines 5—5, 6—6, 7—7, 8—8, 9—9, 10—10, 11—11 and 12—12 respectively of Fig. 2 and showing in elevation the several sheets or units of the filtering element with the compensating sheets thereon as they occur throughout the unit; Fig. 13 is a developed plan view of the filtering unit shown in Fig. 5; Fig. 14 is a plan view of a modified type of filtering unit such as is shown in Fig. 3 with portions of each sheet broken away to show the several sheets and the crossing relation of the material; Fig. 15 is a sectional view on the line 15—15 of Fig. 14; Fig. 16 is a diagrammatic sectional view through a portion of the unit shown in Fig. 14 and showing the manner of securing the sheets in fixed position; Fig. 17 is a front plan view of the filtering unit mounted in its casing; Figs. 18 and 19 are sectional views on the lines 18—18 and 19—19 respectively of Fig. 17; and Fig. 20 is a diagrammatic plan view of the element showing the relative density of the unit.

The present construction shows a filter unit of the same general type as illustrated in my previously mentioned copending application in which the unit or filtering element as a whole is made up of a series of spaced foraminous sheets, preferably formed of pieces of woven wire screen or the like, these sheets being spaced apart by other sheets of similar material which are corrugated or formed with consecutive open folds. As best shown in Fig. 2, the present element is made up of six of the spaced filtering sheets or units, each one being composed of one or more of the sheets, their particular arrangement being described in detail hereinafter. Between each of these units is mounted one of the spacing units or corrugated sheets and there is preferably a corrugated sheet mounted on the intake side of the filtering element over the last filtering unit.

The filtering unit 1 at the exhaust side of the element is preferably made denser than any of the units ahead of it and as best shown in Figs. 3, 4 and 13, this unit consists of three sheets 2, 3 and 4 of woven wire or screen cloth so arranged as to have the wires of the cloth of each sheet arranged at an angle to the wires of the other sheet so as to form openings of the desired size through the unit. This unit is made by taking a sheet of screen cloth of double the size of the finished unit which piece of cloth is cut on the bias as best shown in Fig. 13 and is then folded on itself on the line a—a to form a double sheet. Between the two halves 2 and 3 of this sheet is placed the third sheet 4 of material in which the wires run in different direction from those of the double sheet and when folded it will be seen that the wires in the two halves of the double sheet run in different directions.

For certain purposes, it may be desired to add into this filtering unit at the exhaust side of the filtering element a sheet 5 of cloth fabric or the like and such a construction is shown in Figs. 14 and 15 in which the unit be composed of the same double sheet 2 and 3 as shown in Fig. 15 with the inserted sheet 4 or more of woven wire therebetween and also the sheet 5 of fine cloth material which is likewise inserted between the two halves of the double sheet. In front of this first filtering unit is mounted one of the corrugated sheets 10 and then the second filtering unit 6 is mounted and this unit is preferably made of a plurality of sheets 11, 12 and 13 as best shown in Fig. 5. The double sheet as illustrated in Figs. 5, and 13 consists of two triangular portions 7 and 8 which may be the triangles left after cutting the bias sheet for the first unit and these triangular portions are first put together on the line b—b of Fig. 13 to form a rectangle double the size of the unit and are then folded along the center line a—a with an inserted sheet 9 between to form the rectangular finished unit in which the lines c—c and d—d on Fig. 5 indicate the edges of the two triangular pieces in their folded position.

Figure 11:
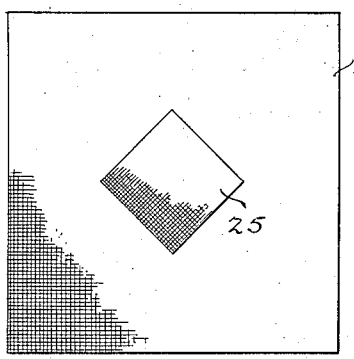
Figure 12:
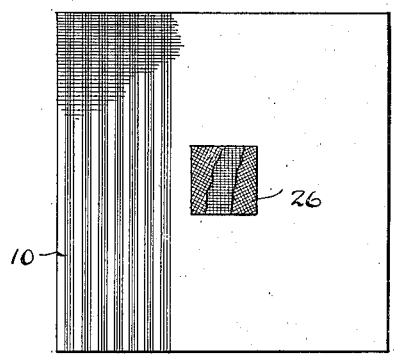
Figure 13:
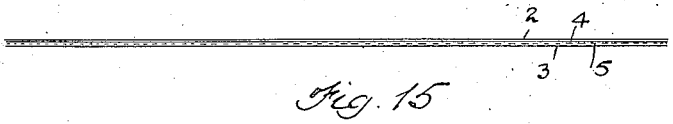

In front of this unit 6 is mounted one of the corrugated sheets 10 such as is shown in Fig. 6 and then the third unit 15 will be mounted and this unit will preferably consist of a single sheet 15 of screen cloth formed by folding a triangle on itself so as to have the wires running at an angle to the edges of the sheet and on this will be mounted a smaller sheet 16 with the wires running at a different angle as best shown in Fig. 7, this smaller sheet leaving a space 17 around the outer edge of the larger sheet and forming the first of the compensating elements. Another corrugated sheet 10 is then mounted and the next layer will consist of a single sheet 20 of screen cloth which will have a smaller compensating sheet 21 mounted thereon, this sheet being preferably turned at 45 degrees to the main sheet so as to have its corners centrally located at the sides of the main sheet as best shown in Fig. 9. Another corrugated sheet 10 is then mounted in the element and the next filtering unit consists of a single sheet 22 of screen cloth having a third and smaller compensating sheet 23 centrally mounted thereon with its wires running at an angle to the full size sheet as best shown in Fig. 10. Another corrugated sheet 10 is then used and the next filtering unit consists of a full size sheet 24 of screen cloth with a smaller compensating sheet 25 mounted at the center as shown in Fig. 11. The spacing corrugated sheet 10 is then mounted and the last unit consists of merely a centrally located compensating sheet 26 smaller in area then the compensating sheet 25 in the next layer and this compensating sheet is preferably formed of double or of woven wire cloth of two or three thicknesses and the filtering element is then completed by mounting another corrugated sheet 10 at the intake side of the unit and this corrugated sheet will be protected by a sheet 30 of heavy woven wire material which is used as the rapping device by which the filtering element may be cleaned.

In making up the filtering units where the units are of two or three or more thicknesses of the filtering material each of these units is preferably fastened together as best shown in Fig. 16 by stapling as at 35 the various layers after they have been cut to size and folded or built up. Each of the filtering units is provided with either a selvage edge in the case of a unit consisting of a single sheet of material or of a folded edge 36 in the case of the units having double or triple sheets of material and the folded and selvage edges of all of the units are placed at the same side of the filtering element so that when the element is mounted in its casing 37 which is open at the bottom 38, these selvage and folded edges 36 will form the bottom of the unit and thus will present to the open side of the casing a finished edge which eliminates the rough wire ends which are apt to catch in the hands of the users and cause cuts or scratches and also to prevent ravelling of the screens.

The casing 37 consists of a rectangular frame having inwardly extending flanges 40 on both sides and provided at the top with a handle 41 as shown in Figs. 17 and 18. To secure the filtering element in the casing, a series of screws or bolts 42 are employed which are passed through the casing flanges and the filtering unit and these bolts are preferably mounted in the bottom flanges, the unit being deep enough to fit snugly in the frame.

It is of course to be understood that the number of filtering units in an element, and the density of each unit will be determined by the use to which the element is to be put. The size, shape and arrangement of the compensating screens will likewise vary with the type of element employed, the present showing of square or rectangular pieces being merely to illustrate one method of obtaining a satisfactory structure.

By forming the exhaust side units of a plurality of sheets having their wires running in different directions, the density of each of the units may be varied to wide limits to fit operating conditions.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A filtering element comprising a body of foraminous material arranged to form a series of baffles, means incorporated in the body of said material and adapted to increase the density of the element from the periphery to the center thereof.

2. A filtering element comprising a series of baffles and means cooperating therewith adapted to increase the resistance of said element to the passage of gas from the periphery to the center thereof.

3. A built up filtering element increasing in density from the periphery to the center and also increasing in density from the air intake side to the air exhaust side.

4. A filtering element comprising a series of spaced parallel foraminous sheets, and a series of compensating foraminous sheets of varying size mounted adjacent certain of said sheets and adapted to increase the density of the complete unit from the periphery to the center thereof.

5. A filtering element comprising a series of spaced parallel corrugated foraminous sheets, other foraminous sheets interposed in immediate sequence between said first named sheets and a series of compensating foraminous sheets of varying size mounted adjacent certain of said sheets and adapted to increase the density of the complete unit from the periphery to the center thereof.

6. A filtering element comprising a series of spaced parallel corrugated foraminous sheets, other foraminous sheets interposed in immediate sequence between said first named sheets and a series of compensating foraminous sheets of varying size mounted adjacent certain of said first named sheets and adapted to increase the density of the complete unit from the periphery to the center thereof, said last series of sheets varying from large to small from the exhaust side to the inlet side of said unit.

7. A filtering element comprising a series of spaced parallel sheets of woven wire screen, other sheets of corrugated woven wire screen between said first named sheets, said first series of screens being of greater density at the exhaust side of said unit than at the intake side thereof and a series of compensating sheets of woven wire material mounted adjacent certain of said first series of parallel sheets and reducing in size from exhaust to inlet side of said unit to form a unit having a steadily increasing density from its periphery to its center.

8. A filtering element comprising a series of spaced parallel woven wire screens, a consecutively corrugated wire screen interposed between said parallel screens, and a sheet of cloth material mounted in flat contactual relation with one of said spaced parallel screens.

9. A filtering element comprising a series of spaced parallel woven wire screens, a consecutively corrugated wire screen interposed between said parallel screens, and a sheet of cloth material mounted in flat contactual relation with the spaced parallel screens at the exhaust side of said filter.

Signed by me this 25th day of March, 1925.

OSCAR V. GREENE.